United States Patent [19]

Lamar

[11] 4,056,711
[45] Nov. 1, 1977

[54] METHOD AND APPARATUS FOR PROGRAMMING MICROPROCESSORS

[76] Inventor: William Paul Lamar, 1024 17th St., Hermosa Beach, Calif. 90254

[21] Appl. No.: 625,673

[22] Filed: Oct. 24, 1975

[51] Int. Cl.² .................. G06K 7/10; G06K 19/06
[52] U.S. Cl. .................. 364/200; 235/454; 235/487; 235/494
[58] Field of Search .............. 235/61.12 N, 61.11 R, 235/61.11 E

[56] References Cited

U.S. PATENT DOCUMENTS

| | | | |
|---|---|---|---|
| 3,022,501 | 2/1962 | Seigle | 235/61.6 A |
| 3,585,369 | 6/1971 | Nather et al. | 235/61.11 R |
| 3,719,926 | 3/1973 | Sangster et al. | 235/61.11 R |
| 3,789,193 | 1/1974 | Bremmer | 235/61.11 R |

*Primary Examiner*—Daryl W. Cook
*Attorney, Agent, or Firm*—I. Michael Bak-Boychuk

[57] ABSTRACT

A method and apparatus for programming microprocessors which require machine code program instructions wherein black and white code strips are selectively pasted on a sequential instruction frame along a preprinted address code column, each code strip including a parallel trailer wherein the english equivalent of the instruction is displayed. A photoelecric, parallel reader is mounted on the frame for translation across the frame to sequentially load both the address code and the pasted on binary coded instructions into a static random access memory chip for the microprocessor. The technique thus provides for selective alteration of such program sequences by removing selected instruction strips and replacing such strips with other coded strips as required to modify the routine.

7 Claims, 4 Drawing Figures

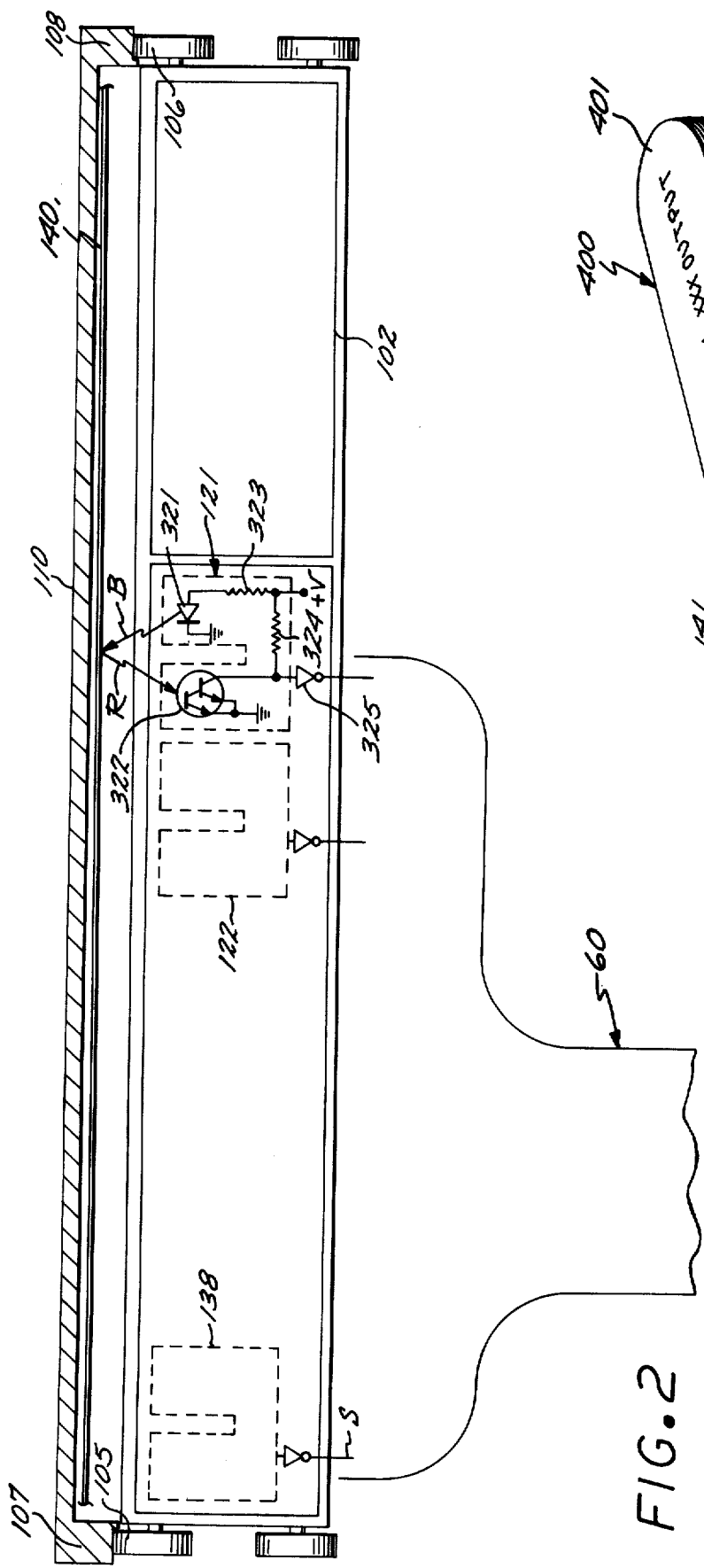
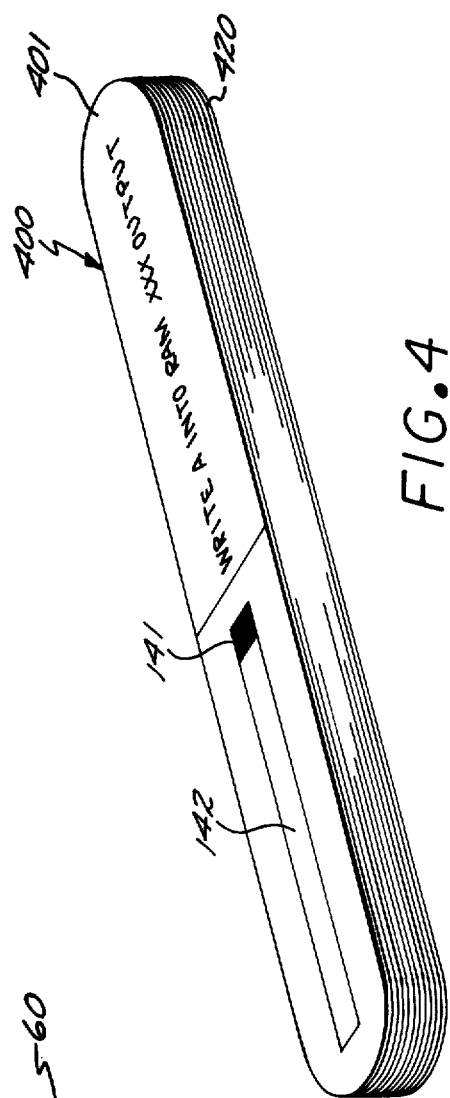
FIG. 2
FIG. 4

METHOD AND APPARATUS FOR PROGRAMMING MICROPROCESSORS

BACKGROUND OF THE INVENTION

1. Field of the Invention

The present invention relates to microprocessors and more particularly to a method and apparatus for loading the program sequence into a microprocessor memory.

2. Description of the Prior Art

Microprocessors, unlike large general purpose computers, normally do not include a compiler which will translate instructions coded in a language comprehensible to a user into the necessary machine language instructions. Thus, a programmer who directs his efforts to programming a microprocessor must necessarily memorize a list of machine code instructions and since such instructions are normally in binary form, there is no convenient way of identifying an erroneous instruction. Furthermore, should a programmer desire to modify an existing program he, again, is faced with a program coded strictly in machine code and, because of the lack of an immediate comprehensive identification of the various code words in the instruction chain, such user very often prefers to start fresh with each new program. To reduce somewhat this frequent redundancy it has been typically practiced in the microprocessing art to segment such programs into standard instruction sequences or subroutines where each subroutine may be stored on a precoded ROM and only the connecting instructions are therefore modifiable. This manner of implementation greatly reduces the efficiency of any programming sequence since by connecting such standard instruction sets, steps often trivial or redundant to the overall program requirements, must be sequenced through during the execution of the program.

Generally a microprocessor offers advantages in cost to the user and is therefore purchased separately from a printing facility. If and when a print-out is desired, either a time-shared printer or a remote printer is brought in and any program instructions are thus listed out. Furthermore, the cost considerations of a microprocessor also dictate relatively limited storage space and therefore render any compiler functions prohibitive. Thus, the required translation into comprehensible instructions is not typically available to a typical user of a microprocessor.

SUMMARY OF THE INVENTION

Accordingly, it is the general purpose and object of the present invention to provide an apparatus and technique by which discrete instructions are inscribed on a narrow strip, one side of the strip including the binary code equivalent of the instruction, while the other side of the strip having displayed thereon the english equivalent, such strips being selectively placed along a column of address codes to be read into a microprocessor.

Further objects of the invention are to provide individual strips, each comprising a single instruction subset which can then be arranged in sequence on a frame for automatic sequential read-in thereof into the memory of the microprocessor.

Yet further objects of the invention are to provide a technique for collecting a microprocessor routine which is convenient in use, requires minimal implementation and is therefore inexpensive.

Briefly, these and other objects are accomplished within the present invention by providing a rectangular frame having disposed on either side thereof a guide rail for translating a transversely disposed photoelectric array. To facilitate the assembly of a microprocessor routine, there is included an address coding column within the frame. each individual instruction is printed on a paper strip having an adhesive backing which is then placed within the frame along the appropriate address code. In order to facilitate a concurrent display of the english language equivalent of the instruction, the photoelectric array includes sensors distributed over a column segment adjacent the encoded areas only and is therefore insensitive to the corresponding translations on the strip. Both the strip and the address sequence are optically coded underneath the sensor segment of the array by way of a black and white cells where cell positions 1–8, for example, correspond to the address code and cells 9–16 provide the instruction code. The coding itself is in the form of black and white areas, the white area either designating a one or a zero depending on the mode of operation of the microprocessor.

Arranged in a column along the address sequence are the corresponding strobing and gating bits whereby the code sequences impressed on the photoelectric array are concurrently strobed and gated by way of yet another pair of photoelectric devices.

For the purposes of illustration herein, a microprocessor such as the MC-S40 model by the Intel Corp., 3065 Bauers Avenue, Santa Clara, Ca., is modified according to the technique herein. Specifically provided for this purpose in the above microprocessor is a static random access memory or RAM. Such as the 2101 model series static RAM by the Intel Corp. which is isolated from the microprocessor buses buffers such as the buffer 8216 model series by, again, the Intel Corporation. The data input and address terminals of the above static RAM are connected by way of a dip clip to the photoelectric array to be thus strobed, gated and loaded with the desired program sequence.

BRIEF DESCRIPTION OF THE DRAWINGS

FIG. 2 is a detailed diagram of the inventive device as practiced in FIG. 1;

FIG. 4 is a perspective illustration of a single instruction strip arranged for repetitive use.

DESCRIPTION OF THE SPECIFIC EMBODIMENTS

While the following description of the invention herein is set forth with particular reference to the Intel Corporation MCS-40 microprocessor, such is for purposes of illustration only. It is contemplated that those skilled in the art will be able to extend the teachings herein to microprocessors other than the MCS-40 and no intent to limit the invention is therefore expressed by the selection of the example herein.

Figure 1:
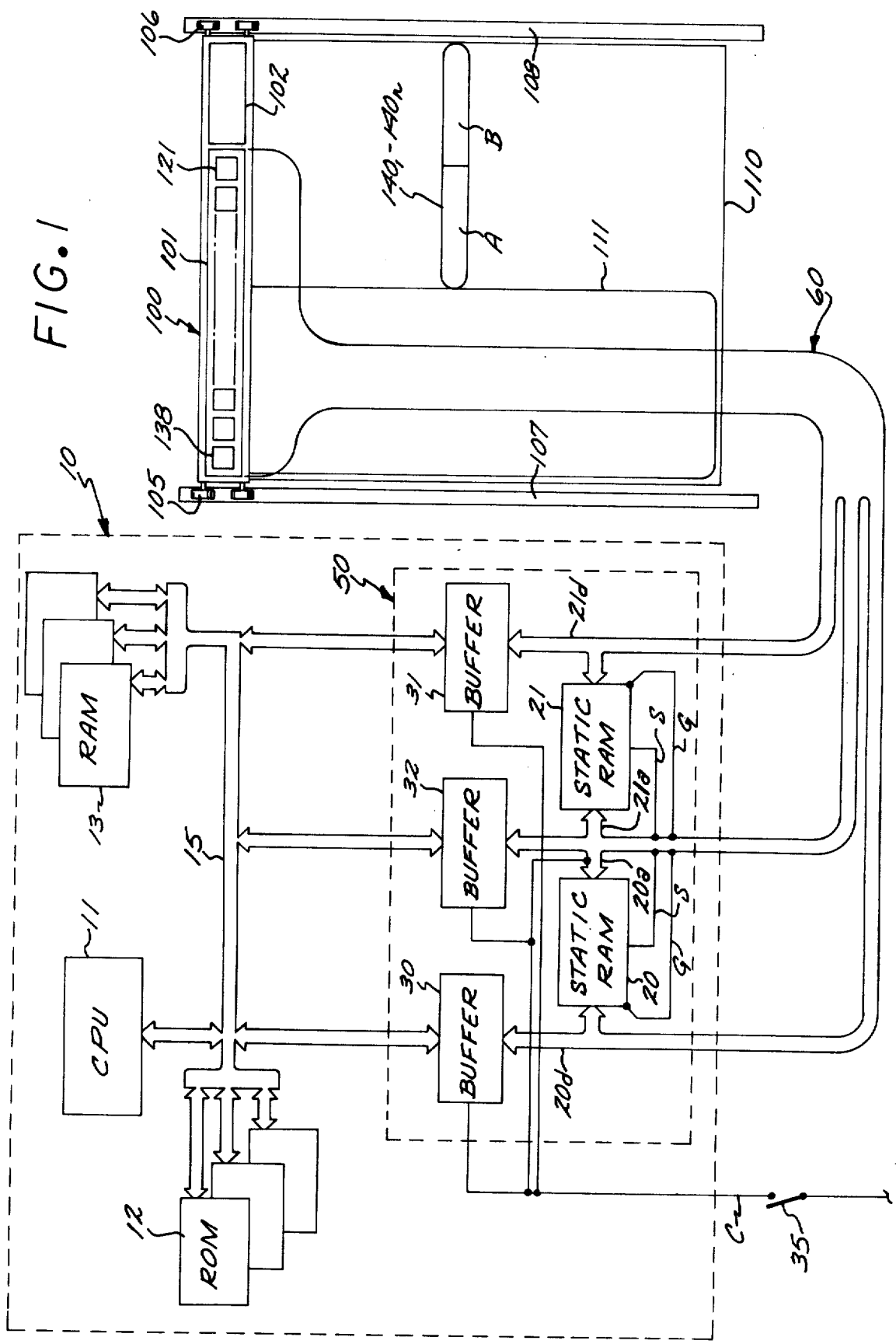
FIG. 1 is a block diagram illustrating the invention device as connected to a conventional prior art microprocessor.

As shown in FIG. 1, a microprocessor such as the aforementioned Intel MCS-40 is generally shown by the numeral 10, such microprocessor comprising the central processing unit CPU-11 an array of read-only memories, (ROMS) 12, and a pliurality of random access memories, (RAMS) 13, all connected to the main system bus 15. For the purposes herein, bus 15 includes both the data and address buses as well as the many signal leads (not described) which are necessary in order to render the microprocessor operable. Specifically not shown but included in the above microprocessor, are the various status leads, clock and other similar functions commonly referred to as the housekeeping functions of the processor. For such details, further consultation should be had to the system description published by the Intel Corporation under the following headings: "Intel MCS-40 User's Manual for Logic Designers", second edition, third printing, March, 1975.

The microprocessor 10 is modified within section 50 to include two static RAMs 20 and 21 such as the aforementioned 2101 RAMs each connected to the system bus 15 by way of a corresponding address bus 20a and 21a and data bus 20d and 21d. Since both the data segment of microprocessor 10 and the data terminals of the RAMs 20 and 21 are four bits wide instructions in eight bit code require therefore two such parallel RAMs.

Buses 20a, 21a, 20d and 21d are isolated from the system bus 15 by way of three bidirectional buffers 30, 31 and 32, buffers 30 and 31 isolating the separate data branches 20d and 21d respectively while buffer 32 isolates branches 20a and 21a collectively. To accomplish this function, buffer 32 comprises two four-bit parallel bidirectional bus drivers such as the Intel Model No. 8216 bus driver, while buffers 30 and 31 each comprise a single such driver. As provided for by the manufacturer, these drivers can be controlled in their direction of data transfer by a collective signal C which, by the articulation of switch 35, controls such direction. Buses 20a, 20d, 21a and 21d are furthermore branched and collected in one signal conduit 60 to emerge to the exterior or processor 10 and connect at the other end in a photoelectric signal reader 100.

More specifically, signal reader 100 includes a reading segment 101 and a blanked segment 102 where the reading segment 101 further includes a plurality of phototransducers 121–138 arranged in a row. Segments 101 and 102 are similarly arranged in a row to thus conform reader 100 into a single row reader sensitive to the reflectivity of the medium subjacent the transducers 121–138. Reader 100 is mounted for row-by-row translation on end rollers 105 and 106 attached to the ends thereof, rollers 105 and 106 respectively engaging two parallel rails 107 and 108 formed along the vertical edges of a rectangular plate 110. Disposed in a column on the subjacent surface of plate 110 along rail 107 and below transducers 129–138, is a paste-on sheet 111 which, according to means to be described, provides the common address sequence to the signal branches or buses 20a and 21a, a strobing signal S and a gating signal G, signals S and G being branched off the conduit 60 to operate in common with the static RAMS 20 and 21.

Arranged adjacent the paste-on sheet 111, in a row-by-row alignment, are a plurality of individual past-on strips $140_1$–$140_n$, each including a coded segment A subjacent transducers 121–128 and a message segment B subjacent the blanked segment 102. Both the paste-on sheet 111 and segments A in the paste-on strips $140_1$–$140_n$ include a message coded by way of black and white cells which respectively provide both the address and the data inputs to the RAMs 20 and 21. Since the data inputs of these RAMS are only four-bits wide, signal conduit 60 necessarily is branched to connect the outputs of transducers 121–124 to the RAM 20 and transducers 125–128 output into RAM 21. Transducers 129–138 are branched in parallel as an eight-bit address to each of these RAMS, including the gating and strobe signals G and S.

Figure 3:
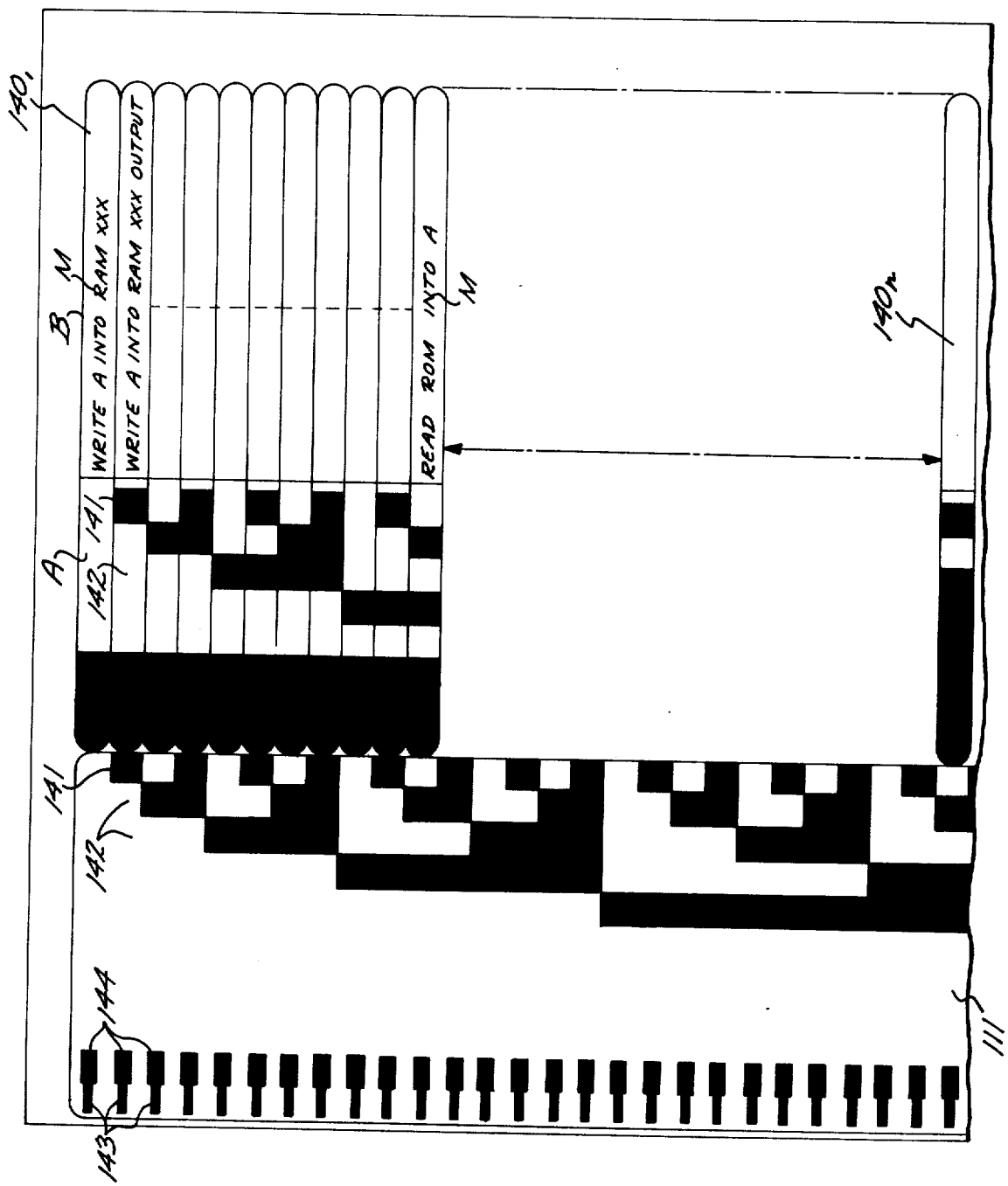
FIG. 3 is a sample instruction sheet listing the various instructions and the corresponding and coding thereof useful with the invention herein.

With particular reference to FIGS. 2 and 3, the detail implementation of the photoelectric reader 100 will now be taken up. Specifically, as shown in FIG. 2, reader 100 includes the aforementioned photoelectric transducers 121–138, each arranged in a U-shaped assembly where transducer 121 illustrated as taken up in detail. In particular, transducer 121 includes a light-emitting diode 321 continuously emitting a beam of light B in the direction of the strip 140 or the paste-on sheet 111. This light is reflected as a beam R at various intensities depending on the local reflectivity to be picked up by a compound phototransistor 322. Diode 321 is connected in series across a resistor 323 to a positive signal source $+V$ and similarly transistor 322 is connected across a collector resistor 324 to the same signal source. The collector voltage of transistor 322 is then applied to an inverter-driver 325 which, at the output thereof, serves as one input to the conduit 60.

By reference to FIG. 3, the strips 40 and the sheet 111 shown scanned by the photoelectric reader 100, includes at the left hand margin thereof, a vertical column of narrow, black, horizontal signal stripes 143 joined by slightly wider signal stripes 144 along the same row. Signal stripes 143 are aligned to be subjacent to the transducer 138 and therefore provide the strobe signal S to the RAMs 20 and 21. Segment 144 is, in turn, subjacent to a transducer 137 which, similar to transducer 138, provides the signal G which is connected to set and clear the static RAMs. Thus, as the transducer is translated downwardly over the sequential strips $140_1$–$140_n$, comprising a routine, an address and an instruction are provided to the RAMs 20 and 21 and are written or recorded therein by the signals S and G. Once recorded, the parallel outputs of RAMS 20 and 21 are brought out onto bus 15 in a conventional manner to control the program sequence of the processor 10. By particular reference to FIG. 3, the content of an exemplary instruction chain on plate 110 is illustrated. Specifically, sheet 111 includes a row of black and white cells 141 and 142 respectively adjacent each segment 143, providing a binary coded address sequence in row-by-row progression. Arranged in corresponding row alignment are the strips $140_1$–$140_n$, each providing a similarly coded sequence of cells 141 and 142 in the section A thereof and a message M inscribed in the segment or field B. This message M advises the user of the contents of the particular instruction such that any instruction sequence can be arranged in conjunction with a fixed address sequence or sheet 111. In this manner various programs can be generated for use in the microprocessor 10.

By reference back to FIGS. 1 and 4, the method of inscribing an instruction chain into the microprocessor will now be taken up. Specifically, shown in FIG. 4 is a stack of prepasted instructions such as the microinstruction corresponding to the strip $140_1$ in FIG. 3. It is to be noted that in this instance reference to strip $140_1$ in FIG. 3 is exemplary only and all other instructions shown therein and may be accommodated in a similar manner. Specifically, shown in FIG. 4 is an instruction stack 400 including a plurality of overlaid strips 401–420, each strip including an identical instruction. Specifically shown on the face of strip 401 are the black and white segments 141 and 142 and the corresponding english language equivalent message M aligned therewith. Thus, the programmer, needing a particular instruction, can peel off the instruction strip 401 and position the strip in the required location on plate 110. Plate 110 will therefore immediately display both the black and white coding array of the instruction sequence and the corresponding english equivalents thereto.

Some of the many advantages of the present invention should now be readily apparent. The invention provides by a technique easily achievable in inexpensive form, a procedure which both renders the coding into a microprocessor comprehensible to the programmer, and permits convenient alteration of the code should the alteration of the microsequence be desired.

Obviously many modifications and variations to the above disclosure can be made without departing from the spirit of the invention. It is therefore intended that the scope of the invention be determined solely dependent on the claims hereto.

I claim:

1. Apparatus for loading a sequence of instructions into a memory section of a data processing device comprising:
   a frame;
   address means selectively securable to said frame for providing a plurality of address signals indicative of the selected individual segments of said memory section;
   data means individually and selectively securable to said frame for providing a plurality of data signals in predetermined geometric relationship with selected ones of said address signals, and for providing a visual display indicative of said data signals; and
   reading means adapted for translation along said frame for responding to said address and data signal and providing coding signals indicative thereof to said memory section.

2. Apparatus according to claim 1 wherein:
   said frame includes a plate member;
   said address means comprises a first medium adapted for releasable attaachment to a selected first portion of said plate member in alignment subjacent to a predetermined one segment of said reading means; and
   said data means comprises a plurality of second medium elements each adapted for releasable attachment to selected second portions of said plate member, in a correlated alignment with selected sections of said medium and subjacent a predetermined other segment of said reading means.

3. Apparatus according to claim 2 wherein:
   said memory section comprises a static random access memory;
   said first medium includes a thin membrane; and
   said second medium elements include thin membrane strips.

4. Apparatus according to claim 3 wherein:
   said address means further includes a gating and a strobe signal associated with each said address signal for controlling said static random access memory.

5. Apparatus according to claim 4 wherein:
   said gating, strobe, address and data signals each comprise dark and light cells; and
   said reading means includes an array of photoelectric transducers disposed to provide said coding signals according to the distribution of said dark and white cells.

6. Apparatus according to claim 5 wherein:
   said address signals are arranged on said medium in a column of progressively increasing address codes, each said address codes having associated therewith an individual one of said gating and strobe signals; and
   individual ones of said strips are aligned in predetermined relationship with said address codes.

7. Apparatus according to claim 6 wherein:
   said dark and light cells on said medium and strips are arranged in columns subjacent selected ones of said photoelectric transducers.

* * * * *